(12) United States Patent
Satou et al.

(10) Patent No.: US 7,921,957 B2
(45) Date of Patent: Apr. 12, 2011

(54) HOOD AIRBAG DEVICE

(75) Inventors: Yoshimitsu Satou, Toyota (JP);
Hiroyuki Takahashi, Aichi-ken (JP)

(73) Assignee: Toyota Jidosha Kabushiki Kaisha,
Toyota-shi, Aichi-ken (JP)

( * ) Notice: Subject to any disclaimer, the term of this patent is extended or adjusted under 35 U.S.C. 154(b) by 185 days.

(21) Appl. No.: 11/885,310

(22) PCT Filed: Oct. 13, 2006

(86) PCT No.: PCT/IB2006/002869
§ 371 (c)(1),
(2), (4) Date: Aug. 30, 2007

(87) PCT Pub. No.: WO2007/045956
PCT Pub. Date: Apr. 26, 2007

(65) Prior Publication Data
US 2008/0202839 A1    Aug. 28, 2008

(30) Foreign Application Priority Data
Oct. 21, 2005    (JP) ................... 2005-307728

(51) Int. Cl.
B60R 21/34    (2006.01)
B60R 21/20    (2006.01)

(52) U.S. Cl. .................. 180/274; 280/728.3; 280/730.1

(58) Field of Classification Search ............... 180/274, 180/69.2, 69.21; 280/728.2, 728.3, 730.1, 280/732
See application file for complete search history.

(56) References Cited

U.S. PATENT DOCUMENTS

| | | | | |
|---|---|---|---|---|
| 5,183,289 A | * | 2/1993 | Zeller et al. | 280/728.3 |
| 5,470,102 A | * | 11/1995 | Smith et al. | 280/728.2 |
| 6,039,341 A | * | 3/2000 | Doxey et al. | 280/728.2 |
| 6,106,005 A | * | 8/2000 | Heinz et al. | 280/730.2 |
| 6,250,669 B1 | * | 6/2001 | Ohmiya | 280/732 |

(Continued)

FOREIGN PATENT DOCUMENTS
EP    1 300 302    4/2003
(Continued)

OTHER PUBLICATIONS

Japanese Office Action dated Jan. 8, 2008.
(Continued)

Primary Examiner — Eric Culbreth
Assistant Examiner — George D. Spisich
(74) Attorney, Agent, or Firm — Finnegan, Henderson, Farabow, Garrett & Dunner, LLP

(57) ABSTRACT

A hood airbag device that includes an inflator, and an airbag. The inflator is provided inside a hood at a position corresponding to an opening formed in the hood. The inflator is disposed such that a gas-injection port (is positioned closer to the rear edge of the opening than to the front edge of the opening in the vehicle fore-and-aft direction. The airbag, which is provided inside the hood, passes through the opening and is deployed toward the outside of a vehicle body, due to the pressure of gas supplied from the inflator. Accordingly, the reference position for deployment of the airbag can be made closer to the rear of the vehicle in the vehicle fore-and-aft direction. Thus, the airbag can be deployed to a large extent in the area closer to the rear of the vehicle in the vehicle fore-and-aft direction.

6 Claims, 7 Drawing Sheets

U.S. PATENT DOCUMENTS

| | | | |
|---|---|---|---|
| 6,827,170 B2 * | 12/2004 | Hamada et al. | 180/274 |
| 6,857,495 B2 * | 2/2005 | Sawa | 180/274 |
| 6,860,505 B2 * | 3/2005 | Yasuda et al. | 280/728.3 |
| 7,150,467 B2 * | 12/2006 | Bayer | 280/728.2 |
| 7,243,754 B2 * | 7/2007 | Mori et al. | 180/274 |
| 7,341,274 B2 * | 3/2008 | Mori et al. | 280/728.2 |
| 7,380,813 B2 * | 6/2008 | Lanzinger et al. | 280/728.3 |
| 2002/0149182 A1 * | 10/2002 | Yasuda | 280/732 |
| 2003/0062208 A1 * | 4/2003 | Hamada et al. | 180/274 |
| 2003/0075373 A1 * | 4/2003 | Sawa et al. | 180/271 |
| 2003/0080540 A1 * | 5/2003 | Kinane | 280/728.2 |
| 2004/0262894 A1 * | 12/2004 | Kempf | 280/730.1 |
| 2005/0205333 A1 * | 9/2005 | Mori et al. | 180/274 |
| 2005/0206139 A1 * | 9/2005 | Mori et al. | 280/730.1 |

FOREIGN PATENT DOCUMENTS

| | | |
|---|---|---|
| JP | 8-11662 | 1/1996 |
| JP | 8-72666 | 3/1996 |
| JP | 2003-220910 | 8/2003 |
| JP | 2004-136813 | 5/2004 |
| JP | 2005-262953 | 9/2005 |
| JP | 2005-280556 | 10/2005 |

OTHER PUBLICATIONS

Japanese Office Action dated Mar. 25, 2008.
International Search Report.
Written Opinion of the ISA.

* cited by examiner

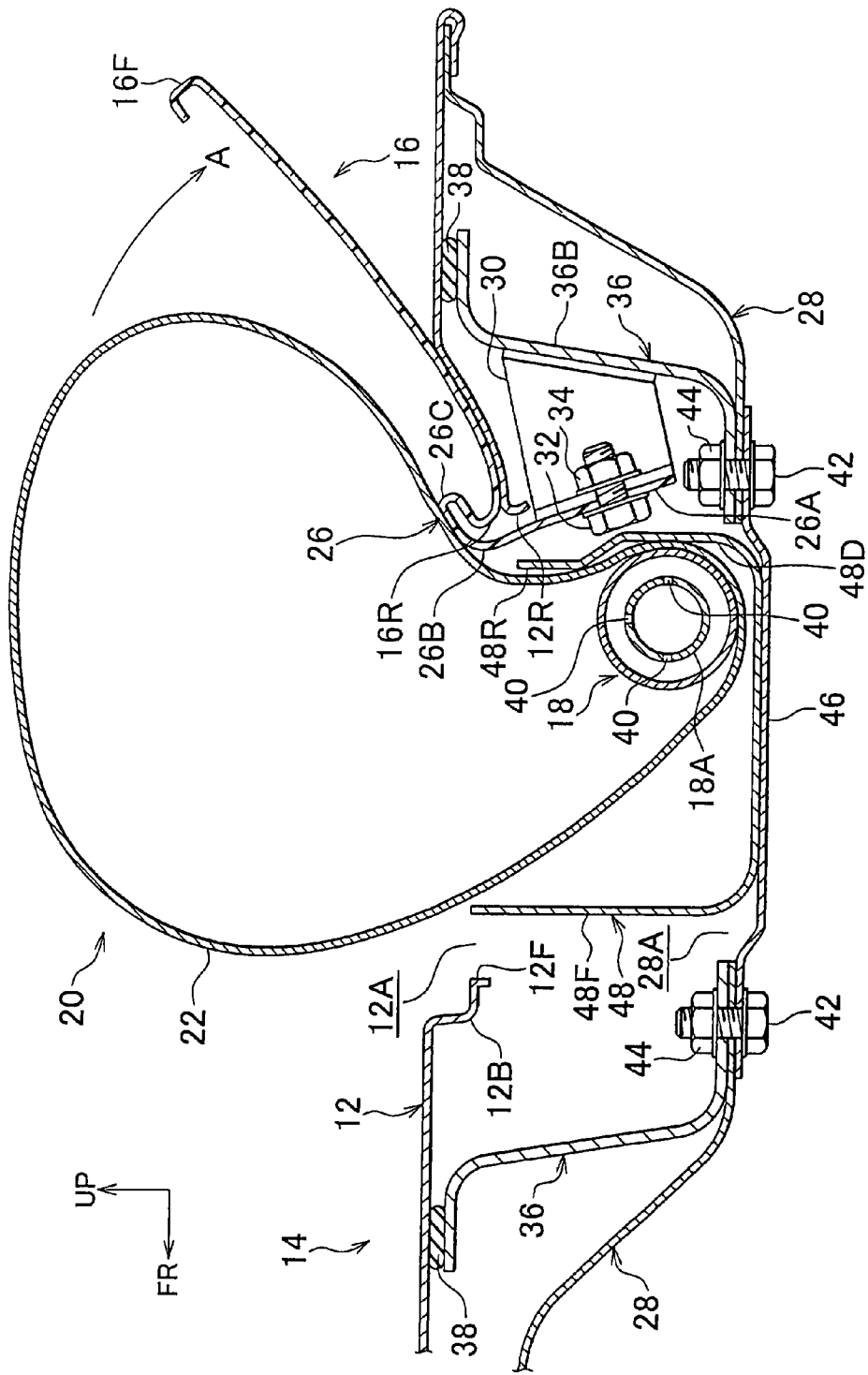

HOOD AIRBAG DEVICE

BACKGROUND OF THE INVENTION

1. Field of the Invention

The invention relates to a hood airbag device including an airbag that is deployed toward the outside of a hood.

2. Description of the Related Art

Japanese Patent Application Publication No. JP-A-8-11662 describes a hood airbag device including an airbag that is deployed toward the outside of a vehicle body. When the airbag device operates, a horizontally long lid (door), which covers an opening formed in a hood, is opened by the deployment force of the airbag. Then, the airbag passes through the opening, and is deployed toward the outside of the vehicle body.

However, in the above-described hood airbag device, an inflator is disposed near the center of the opening in the hood in a vehicle fore-and-aft direction. Therefore, when the airbag needs to be deployed in an area closer to the rear of the vehicle in the vehicle fore-and-aft direction, the capacity of the airbag and the output of the inflator need to be increased.

SUMMARY OF THE INVENTION

It is an object of the invention to make it possible to deploy an airbag in an area which is outside a vehicle body, and which is closer to the rear of a vehicle in a vehicle fore-and-aft direction, without increasing the capacity of the airbag and the output of an inflator.

A first aspect of the invention relates to a hood airbag device that includes an inflator, and an airbag. The inflator is provided inside a hood at a position corresponding to an opening formed in the hood. The inflator is disposed such that a gas-injection port, through which gas is injected when a collision occurs, is positioned closer to the rear edge of the opening than to the front edge of the opening in a vehicle fore-and-aft direction. The airbag, which is provided inside the hood, is inflated due to the pressure of gas supplied from the inflator. The airbag passes through the opening in the hood, and is deployed toward the outside of a vehicle body.

In the hood airbag device according to the first aspect of the invention, the inflator is disposed such that the gas-injection portion is positioned closer to the rear edge of the opening than to the front edge of the opening in the vehicle fore-and-aft direction. Therefore, the reference position for deployment of the airbag can be made closer to the rear of the vehicle in the vehicle fore-and-aft direction. Thus, the airbag can be deployed to a large extent in the area which is outside the hood, and which is closer to the rear of the vehicle in the vehicle fore-and-aft direction, without increasing the capacity of the airbag and the output of the inflator.

The hood airbag device according to the first aspect may further include a door which is provided in the hood to cover the opening, and which pivots around the rear edge portion of the door, and is opened toward the rear of the vehicle in the vehicle fore-and-aft direction to uncover the opening. The portion of the airbag, which is positioned ahead of the gas-injection port of the inflator in the vehicle fore-and-aft direction, may be folded a large number of times, as compared to any other portion of the airbag. The airbag that is in a folded state may be housed inside the hood.

According to the above-described aspect, because the opening of the hood is covered by the door, the airbag and the like are not usually exposed to, for example, wind and rain. Thus, the airbag and the like can be stably protected until the hood airbag device needs to be operated. Also, the portion of the airbag, which is positioned ahead of the gas-injection port of the inflator in the vehicle fore-and-aft direction, is folded a large number of times, as compared to any other portion of the airbag. The airbag that is in a folded state is housed inside the hood. Therefore, when the hood airbag device operates, mainly the portion of the airbag, which is positioned ahead of the gas-injection port, starts to be inflated, and strong inflation pressure is applied to the front edge portion of the door in such a direction as to open the door. The door pivots around the rear edge portion, and is opened. Therefore, when the strong inflation pressure is applied to the front edge portion of the door, the door smoothly pivots around the rear edge portion, and is opened. As the door is opened, the airbag is deployed in the area which is outside the hood, and which is closer to the rear of the vehicle in the vehicle fore-and-aft direction.

Thus, in the hood airbag device according to the above-described aspect, the door can be smoothly opened, and the airbag can be deployed in the area which is outside the hood, and which is closer to the rear of the vehicle in the vehicle fore-and-aft direction.

In the above-described aspect, an attachment hinge may be provided in the rear edge portion of the door. The attachment hinge may include a deformable portion that can be plastically deformed.

The attachment hinge may be provided in each of three portions that are a center portion and both end portions in a vehicle-width direction. The area that is deformed in the deformable portion of the attachment hinge disposed in the center portion may be larger than the areas that are deformed in the deformable portions of the attachment hinges disposed in the both end portions in the vehicle-width direction. By making the area that is deformed in the deformable portion of the attachment hinge disposed in the center potion larger than the areas that are deformed in the deformable portions of the attachment hinges disposed in the both end portions in the vehicle-width direction, the door, which is curved toward the front of the vehicle, can be uniformly opened.

Further, in the above-described aspect, the airbag may be disposed in a case which is provided inside the hood, and which is open toward the opening. The gas-injection port may be provided integrally with the inflator, and the inflator may be disposed at such a position that the inflator substantially contacts the inside of the rear wall of the case in the vehicle fore-and-aft direction.

According to the above-described aspect, the airbag is disposed in the case which is provided inside the hood, and which is open toward the opening. The gas-injection port is provided integrally with the inflator, and the inflator is disposed at such a position that the inflator substantially contacts the inside of the rear wall of the case in the vehicle fore-and-aft direction. Therefore, when the hood airbag device operates, the airbag starts to be inflated while the reference position for deployment is the position close to the rear wall of the case. Further, the airbag is guided by the case, and is inflated toward the opening. Thus, the airbag is smoothly deployed in the area which is outside the hood, and which is closer to the rear of the vehicle in the vehicle fore-and-aft direction.

In the case where the door is provided on the opening in the hood, the airbag is guided by the case, and is inflated toward the door. Therefore, the inflation pressure is efficiently applied to the door, and the door is opened more smoothly.

According to the above-described aspect, the airbag can be appropriately guided in an inflation-deployment direction by the case that is open toward the opening in the hood. Therefore, the airbag can be efficiently inflated and deployed.

In the above-described aspect, a concave portion, which protrudes toward the rear of the vehicle in the vehicle foreand-aft direction, may be formed in the lower portion of the rear wall of the case. The inflator may be disposed at such a position that the inflator substantially contacts the inside of the concave portion. The rear wall of the case may be deformed by a predetermined amount toward the rear of the vehicle in the vehicle fore-and-aft direction due to inflation pressure of the airbag.

In the above-described aspect, the gas-injection port may be provided in a pipe that connects the inflator to the airbag.

BRIEF DESCRIPTION OF THE DRAWINGS

The foregoing and/or further objects, features and advantages of the invention will become more apparent from the following description of example embodiments with reference to the accompanying drawings, in which the same or corresponding portions are denoted by the same reference numerals and wherein:

FIG. 7 is a sectional view showing that the deformable portion of the attachment hinge is stretched, and the door is turned substantially upside down and is opened due to inflation and deployment of the airbag, after the door starts to be opened as shown in FIG. 6.

DETAILED DESCRIPTION OF THE EXAMPLE EMBODIMENTS

Figure 1:
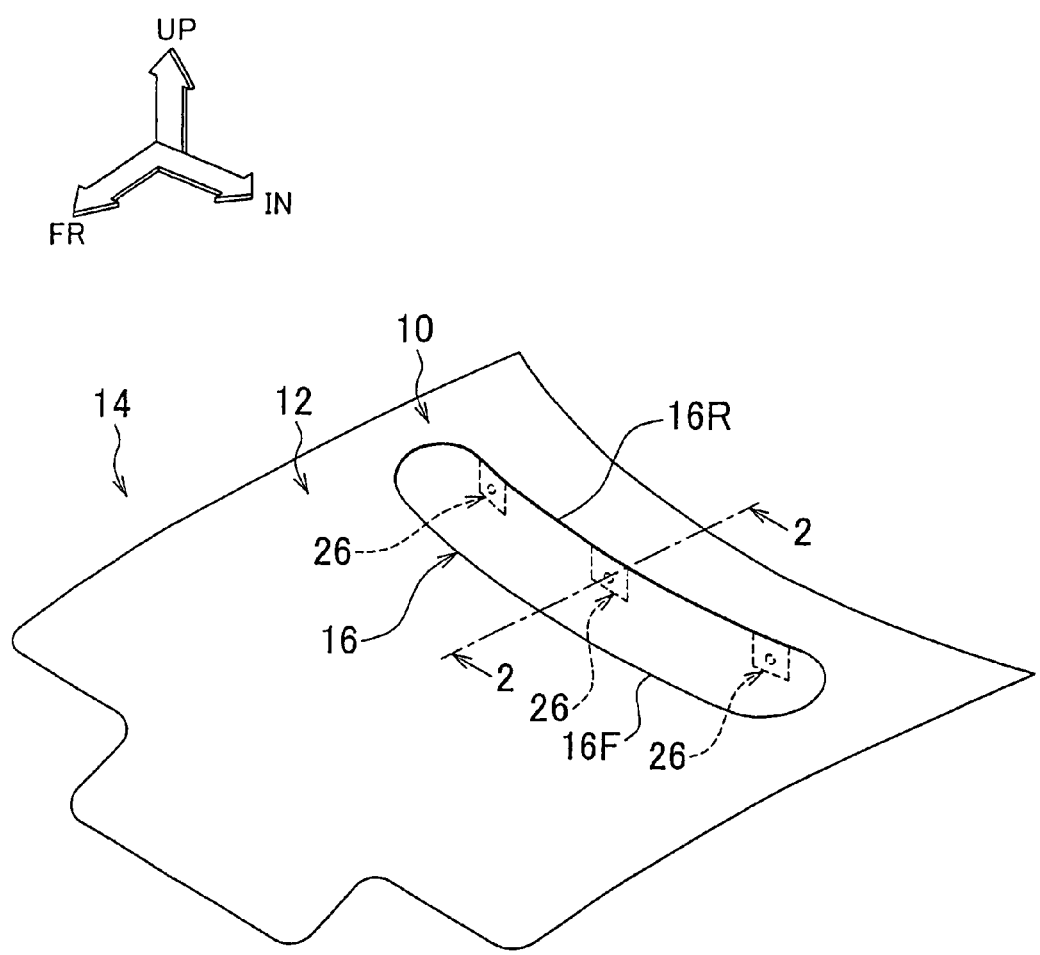
FIG. 1 is a perspective view showing a hood to which a hood airbag device according to a first aspect of the invention is applied.

Hereinafter, embodiments of the invention will be described with reference to the accompanying drawings.

I. First Embodiment

In FIG. 1 to FIG. 4, a hood airbag device 10 according a first embodiment is provided inside a hood 14, for example, at a position in the vicinity of a rear end close to a front windshield (not shown). The hood 14 includes a hood outer panel 12 and a hood inner panel 28. The hood airbag device 10 includes a door 16, an inflator 18, and an airbag 22.

Figure 2:
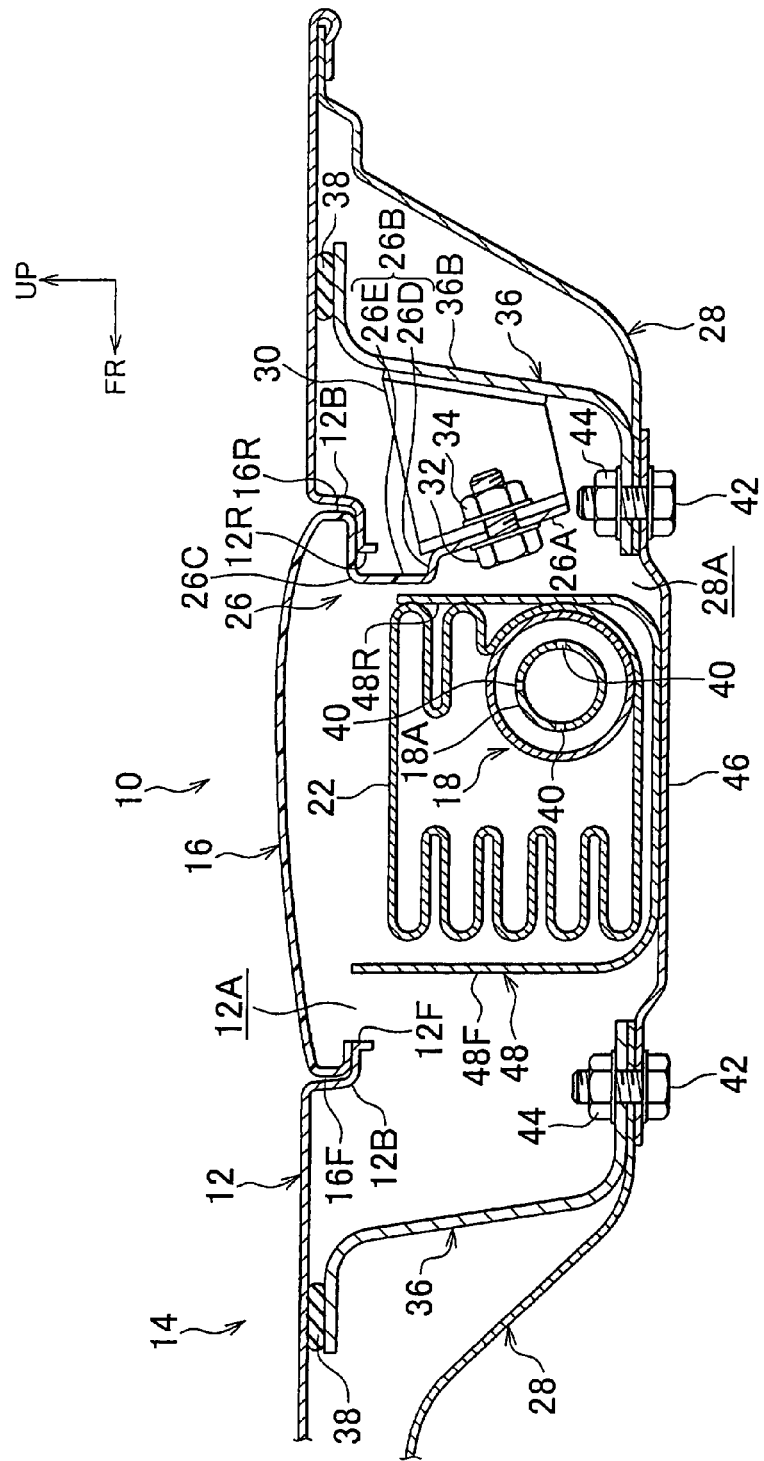
FIG. 2 is a sectional view taken along line 2-2 in FIG. 1.

The door 16 is provided in the hood outer panel 12 that is the outer panel of the hood 14. When an impactor (not shown) collides with the front bumper of a vehicle to which the hood airbag device 10 according to the embodiment is applied, the airbag 22 is inflated and deployed. As a result, the door 16 is pressed and opened to uncover an opening 12A in the hood outer panel 12. The airbag 22 is protruded through the opening 12A. The door 16 is a covering body made of, for example, metal. As shown in FIG. 2, the door 16 is fitted to the inside of the frame portion 12B that is a concave portion formed in the hood outer panel 12.

As shown in FIG. 1, in a plan view, the door 16 is formed to be elongate in a vehicle-width direction. The door 16 has a substantially equal width over the entire length thereof. The door 16 has a curved shape. That is, the center portion of the door 16 in the longitudinal direction protrudes toward one side in the width direction of the door 16 (i.e., toward the front of the vehicle in the embodiment). The invention is not limited to the door 16 that is formed separately from the hood outer panel 12. That is, the door 16 may be formed integrally with the hood outer panel 12. In this case, when the airbag 22 is inflated, the hood outer panel 12 is torn at a position corresponding to the frame portion 12B, and the door 16 is opened. Also, the invention is not limited to the door 16 that is elongate in the vehicle-width direction. That is, the door 16 may be relatively short in the case where an airbag having a small capacity (not shown) is provided.

Further, attachment hinges 26 are provided in the rear edge portion 16R of the door 16 at three portions, for example, the center portion and both end portions in the longitudinal direction. The attachment hinges 26 connect the door 16 to the hood 14 such that the door 16 is opened in a predetermined direction, for example, toward the rear of the vehicle when the airbag 22 is inflated. More specifically, as shown in FIG. 2, an attachment bracket 30 is fixed to a vertical wall 26B in the rear portion of a reinforcement 36 in the vehicle fore-and-aft direction. The reinforcement 36 is provided to reinforce the inside of the hood 14. One end 26A of each attachment hinge 26 is fixed to the attachment bracket 30 using a bolt 32 and a nut 34. The other end of each attachment hinge 26 is a connection portion 26C that is connected to the door 16. The reinforcement 36 and an attachment member 46 are fixed to the hood inner panel 28 using a bolt 42 and a nut 44. The reinforcement 36 is joined to the hood outer panel 12 through sealing agent 38.

Each attachment hinge 26 has a deformable portion 26B that can be plastically deformed when the door 16 is opened. For example, the deformable portion 26B of each attachment hinge 26 is formed to be bent so that the required amount of deformation stroke can be obtained. More specifically, the deformable portion 26B includes a droop portion 26E and an intermediate portion 26D. The droop portion 26E is elongate, and extends downward from the connection portion 26C connected to the door 16. The intermediate portion 26D extends from the droop portion 26E toward the rear of the vehicle. The one end 26A of the attachment hinge 26 obliquely extends from the rear end of the intermediate portion 26D toward the bottom of the vehicle. In the case where the center of the door 16 protrudes toward the front of the vehicle as shown in FIG. 1, and the attachment hinge 26 in the center portion includes the deformable portion 26B, it is preferable that the area that is deformed in the deformable portion 26B of the attachment hinge 26 disposed in the center portion be larger than the areas that are deformed in the deformable portions 26B of the attachment hinges 26 disposed in the both end portions.

As shown in FIG. 2, the inflator 18 is disposed in the airbag 22 such that gas-injection ports 40 are positioned closer to the rear edge 12R of the opening 12A than to the front edge 12F in the vehicle fore-and-aft direction. Gas is injected through the gas-injection ports 40 at the time of collision. For example, the gas-injection ports 40 are provided on the outer periphery of a small-diameter portion 18A that is formed in the end portion of the inflator 18 coaxially with the inflator 18.

More specifically, the inflator 18 is provided inside the hood 14 at a position corresponding to the opening 12A in the hood 14. The inflator 18 and the airbag 22 are housed in a case 48 that is open toward the opening 12A. The inflator 18 is fixed to the rear wall 48R of the case 48 using, for example, a screw (not shown). For example, the case 48 is fixed on the attachment member 46 that is fitted to the lower surface of the hood inner panel 28 using the bolt 42 and the nut 44. The case 48 is inserted into an insertion hole 28A formed in the lower surface of the hood inner panel 28, and is disposed inside the hood 14. An insertion hole similar to the insertion hole 28A is formed in the reinforcement 36 provided inside the hood 14. At least one of the gas-injection ports 40 needs to be disposed ahead of the rear edge 12R of the opening 12A. It is not necessary to dispose all the gas-injection ports 40 ahead of the rear edge 12R. Accordingly, at least one of the gas-injection ports 40 may be disposed below or behind the rear edge 12R.

When the case 48 is disposed inside the hood 14, the front wall 48F of the case 48 is positioned closer to the front edge 12F of the opening 12A than to the rear edge 12R. The rear wall 48R of the case 48 is positioned closer to the rear edge 12R of the opening 12A than to the front edge 12F. In this embodiment, as shown in FIG. 2, both of the front wall 48F and the rear wall 48R are disposed between the front edge 12F and the rear edge 12R of the opening 12A. Each of the front wall 48F and the rear wall 48R is formed to be flat, and to extend toward the opening 12A. Therefore, all the gas-injection ports 40 of the inflator 18 are positioned between the front edge 12F and the rear edge 12R, and closer to the rear edge 12R than to the front edge 12F. The inflator 18 is fixed at the position offset from the center of the opening 12A in the vehicle fore-and-aft direction toward the rear edge 12R to the fullest extent. That is, the inflator 18 is fixed at such a position that the inflator 18 substantially contacts the inside of the rear wall 48R of the case 48. Thus, the inflator 18 is disposed in the case 48, which is a storage space, at the rearmost position in the vehicle fore-and-aft direction. The phrase "the inflator 18 substantially contacts the inside of the rear wall 48R" signifies that the inflator 18 directly contacts the inside of the rear wall 48R, or that the inflator 18 indirectly contacts the inside of the rear wall 48R via the airbag 22, or that the inflator 18 is very close to the inside of the rear wall 48R.

The invention is not limited to the gas-injection ports 40 that are provided on the outer periphery of the small-diameter portion 18A of the inflator 18. Gas may be supplied into the airbag 22 from the inflator 18 through a diffuser pipe or the like (not shown). In this case, the portion of the diffuser pipe close to the airbag 22 functions as the gas-injection port 40. The gas-injection port 40 of the diffuser pipe or the like is positioned closer to the rear edge 12R than to the front edge 12F. Therefore, the inflator 18 itself can be positioned relatively freely. For example, the inflator 18 may be disposed outside the case 48, or the outside the hood 14.

As shown in FIG. 2, the airbag 22 is disposed inside the hood outer panel 12 at a predetermined position. For example, the airbag 22 is disposed in the case 48 that is open toward the opening 12A. In a predetermined situation, the airbag 22 is inflated due to the pressure of the gas supplied from the inflator 18, and the airbag 22 opens the door 16. Then, the airbag 22 passes through the opening 12A in the hood outer panel 12, and is deployed toward the outside of the vehicle body. Mainly the portion of the airbag 22, which is positioned ahead of the gas-injection ports 40 of the inflator 18 in the vehicle fore-and-aft direction, is folded. Then, the airbag 22 in a folded state is housed in the case 48. The case 48 and the inflator 18 are fixed to the rear wall 48R of the case 48. Accordingly, the reference position for deployment of the airbag 22 is the rear wall 48 of the case 48 to which the airbag 22 is fixed.

The phrase "mainly the portion of the airbag 22, which is positioned ahead of the gas-injection ports 40 in the vehicle fore-and-aft direction, is folded" signifies that the portion of the airbag 22, which is positioned close to the gas-injection ports 40 of the inflator, is folded a small number of times, and the portion of the airbag 22, which is positioned ahead of the gas-injection ports 40 (i.e., the portion close to the front wall 48F of the case 48), is folded a large number of times, because the inflator 18 is disposed close to the rear wall 48R of the case 48, as shown in FIG. 2.

II. Effects

In the hood airbag device 10 according to the embodiment, because the opening 12A of the hood outer panel 12 is covered by the door 16, the airbag 22 and the like are not usually exposed to, for example, wind and rain. Thus, the airbag 22 and the like can be stably protected until the hood airbag device 10 needs to be operated.

If an impactor collides with the front bumper of the vehicle to which the hood airbag device 10 is applied, an airbag ECU operates the inflator 18 in response to a signal from a frontal-collision sensor. Thus, a large amount of gas is supplied into the airbag 22 from the inflator 18.

Figure 3:
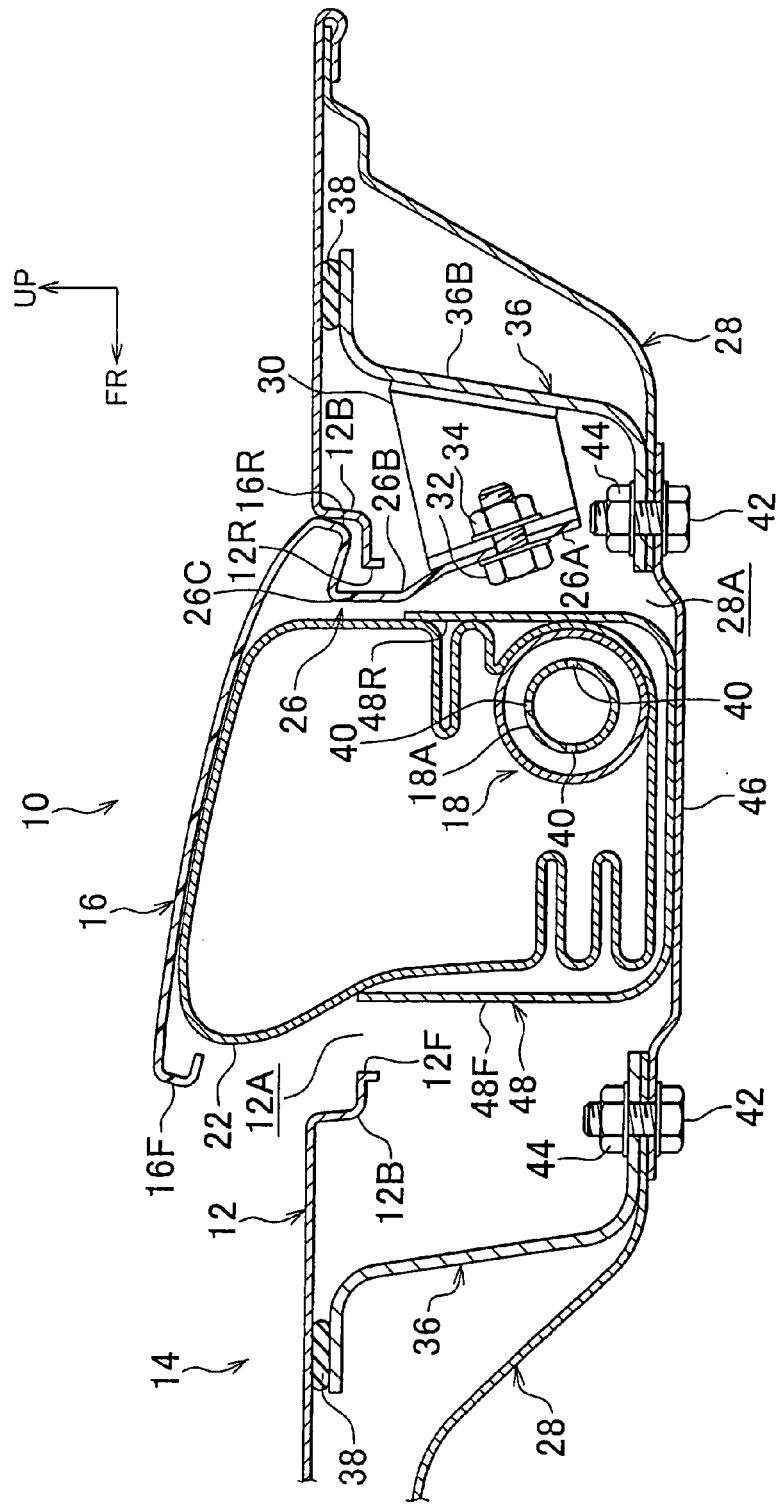
FIG. 3 is a sectional view showing that a door starts to be opened due to inflation of an airbag in FIG. 2.

Mainly the portion of the airbag 22, which is positioned ahead of the gas-injection ports 40 of the inflator 18, is folded, and then the airbag 22 in the folded state is housed in the case 48 inside the hood 14. Therefore, as shown in FIG. 3, mainly the portion of the airbag 22, which is positioned ahead of the gas-injection ports 40, starts to be inflated to a large extent, and is guided toward the opening 12A by the case 48 to reach the front edge portion 16F of the door 16. Thus, strong inflation pressure is applied to the front edge portion 16F in such a direction as to open the door 16. Because the airbag 22 is appropriately guided in the deployment direction by the case 48, the airbag 22 can be efficiently inflated and deployed.

Figure 4:
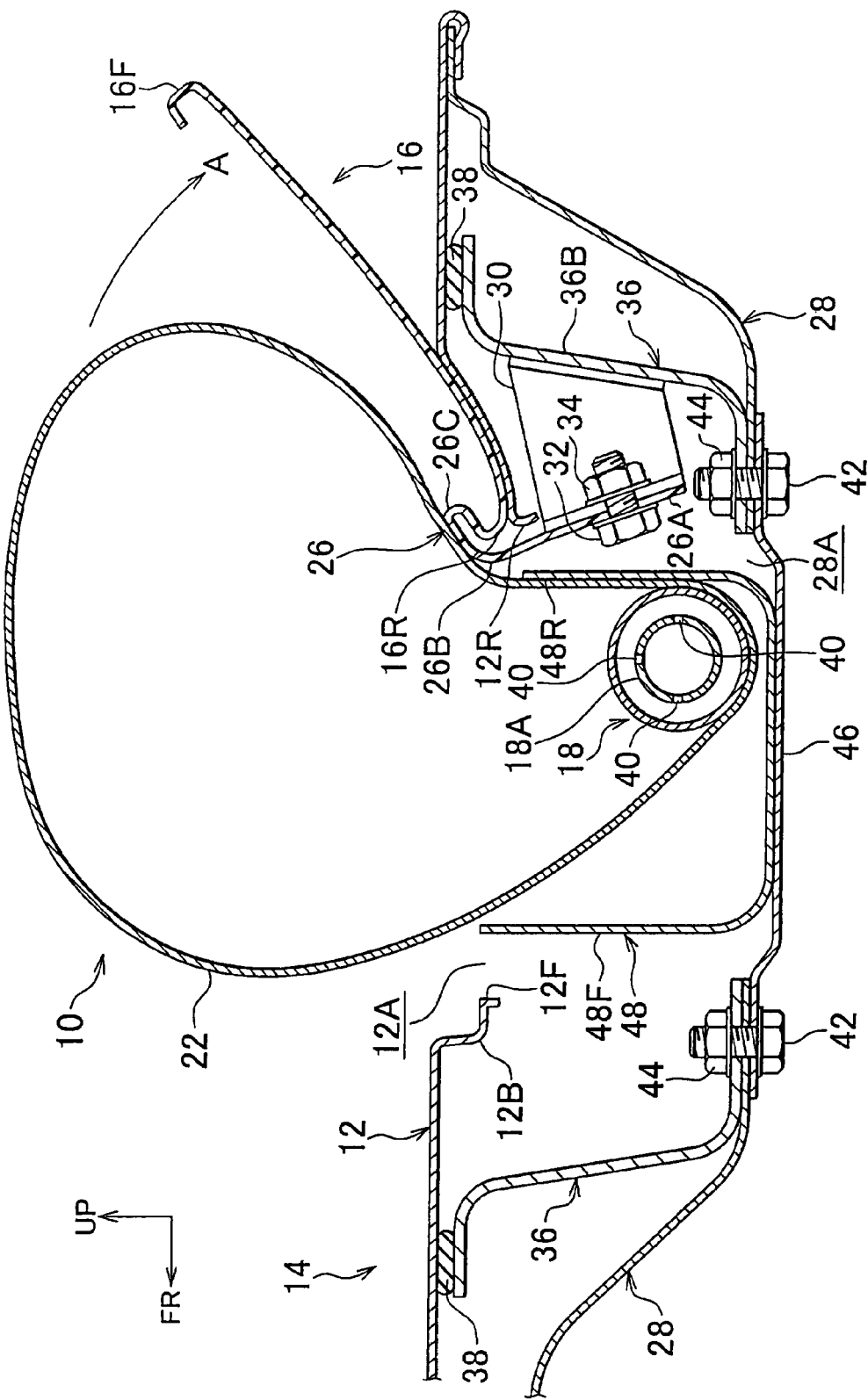
FIG. 4 is a sectional view showing that the deformable portion of attachment hinge is stretched, and the door is turned substantially upside down, and is opened due to inflation and deployment of the airbag, after the airbag starts to be deployed as shown in FIG. 3.

The door 16 is supported by the attachment hinges 26. The door 16 pivots around the rear edge portion 16R, and is opened. Therefore, by applying the strong inflation pressure to the front edge portion 16F of the door 16, a sufficient moment is applied to the door 16 in such a direction as to open the door. Thus, the door 16 quickly starts to be opened. After the door 16 starts to be opened, the deformable portions 26B of the attachment hinges 26, which are bent, are plastically deformed. That is, the deformable portions 26B are unbent and stretched. Accordingly, as shown in FIG. 4, the door 16 further pivots around the rear edge portion 16R smoothly in a direction shown by an arrow A. As a result, the door 16 is placed in an open position. At this time, the upper surface of the hood outer panel 12 is pressed by the door 16, and is deformed to some extent.

As shown in FIG. 4, when the door 16 is opened, the airbag 22 passes through the opening 12A in the hood outer panel 12, and is deployed toward the outside of the hood 14. In the hood airbag apparatus 10, the inflator 18 is disposed such that the gas-injection ports 40 of the inflator 18 are positioned closer to the rear edge 12R of the opening 12A in the outer panel 12 than to the front edge 12F. That is, the inflator 18 is positioned such that the inflator 18 substantially contacts the inside of the rear wall 48R. Therefore, the reference position for deployment of the airbag 22, that is, the position at which the airbag 22 is fixed, can be made closer to the rear of the vehicle in the vehicle fore-and-aft direction. Thus, the airbag 22 can be deployed so as to cover the area which is outside the hood 14, and which is closer to the rear of the vehicle in the vehicle fore-and-aft direction, without increasing the capacity of the airbag 22 and the output from the inflator 18. That is, the airbag 22 can be deployed so as to cover, for example, the rear portion of the hood 14, the lower portion of the front windshield, and the right and left front pillars. In other words, because the inflator 18 is disposed inside the hood 14 at the position closer to the rear of the vehicle, the airbag 22 can be deployed in the area closer to the rear of the vehicle in the vehicle fore-and-aft direction. If an impactor collides with the front bumper, the impactor hits the airbag that has been deployed in the above-described manner. Therefore, the impact can be absorbed.

III. Second Embodiment

In a hood airbag device 20 according to a second embodiment, a concave portion 48D is formed in the lower portion of the rear wall 48R of the case 48. The concave portion 48D protrudes toward the rear of the vehicle in the vehicle fore-and-aft direction. The inflator 18 is fitted to the case 48 such that the inflator 18 substantially contacts the inside of the concave portion 48D. Therefore, the inflator 18 is further closer to the rear edge 12R of the opening 12A than the inflator 18 in the first embodiment is.

Other portions in the second embodiment are the same as those in the first embodiment. Therefore, the same portions as in the first embodiment are denoted by the same reference numerals, and description thereof will be omitted.

IV. Effects

Figure 6:
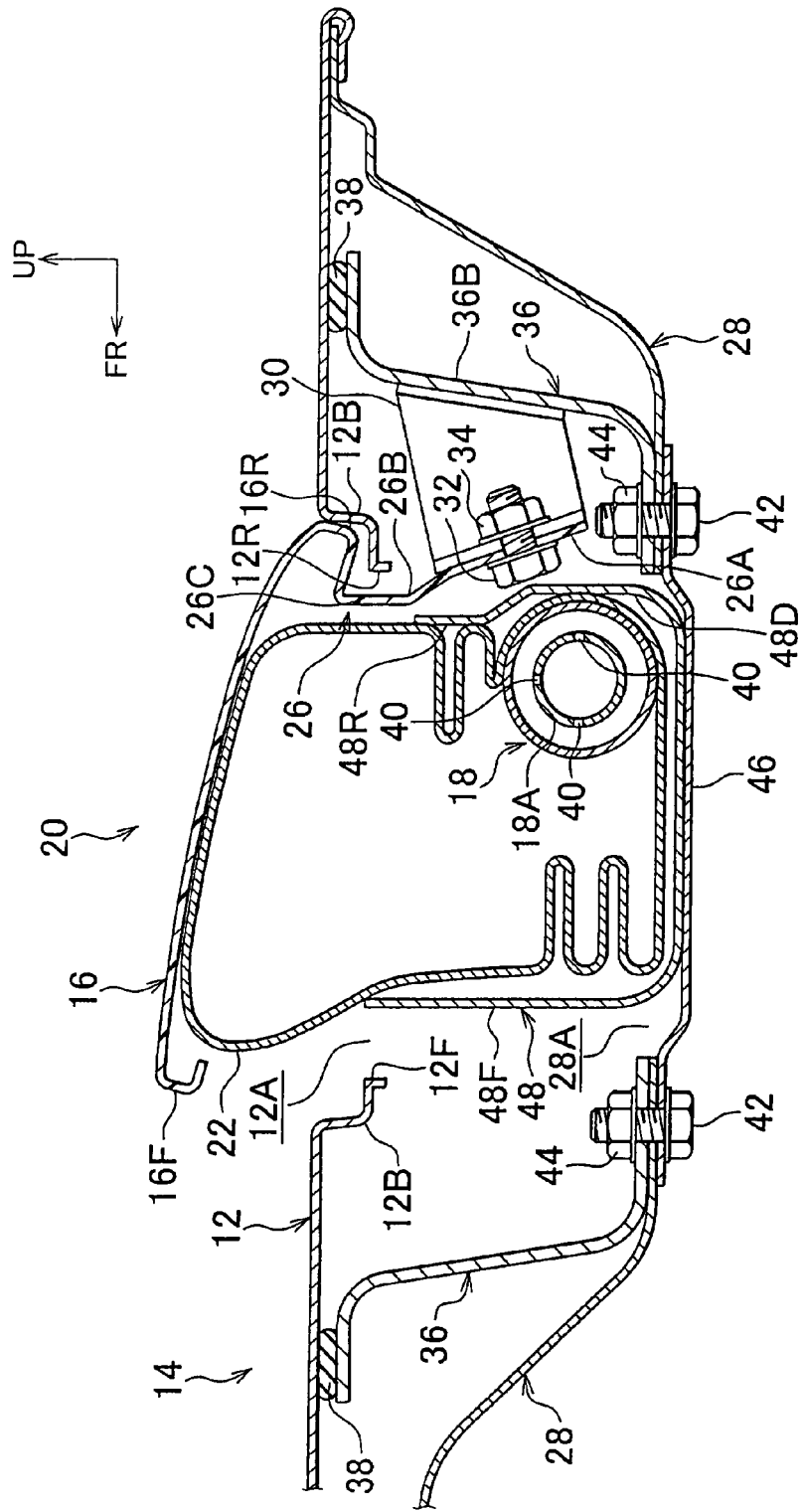
FIG. 6 is a sectional view showing that the door starts to be opened due to inflation of an airbag in the second embodiment.

The basic effects of the hood airbag device 20 are the same as those of the hood airbag device 10 according to the first embodiment. As shown in FIG. 6, in the hood airbag device 20, the inflator 18 is disposed at the position further closer to the rear edge 12R of the opening 12A, that is, at the position further closer to the rear of the vehicle in the vehicle fore-and-aft direction than the inflator 18 in the first embodiment is. Therefore, the reference position for deployment of the airbag 22, for example, the position at which the airbag 22 is fixed, is close to the rear of the vehicle in the vehicle fore-and-aft direction, as compared to the first embodiment. Thus, as shown in FIG. 7, the airbag 22 can be deployed in the area that is further closer to the rear of the vehicle in the vehicle fore-and-aft direction, without changing the capacity of the airbag 22 and the shape of the airbag 22 in a deployed state.

In the hood airbag device 20, the concave portion 48D is formed in the lower portion of the rear wall 48R of the case 48. The upper portion of the rear wall 48R does not protrude toward the rear of the vehicle in the vehicle fore-and-aft direction. Therefore, the rear wall 48R does not interfere with the attachment hinges 26. Thus, the airbag 22 can be fixed at the position closer to the rear of the vehicle in the vehicle fore-and-aft direction, without making it difficult to open the door 16 smoothly.

Figure 5:
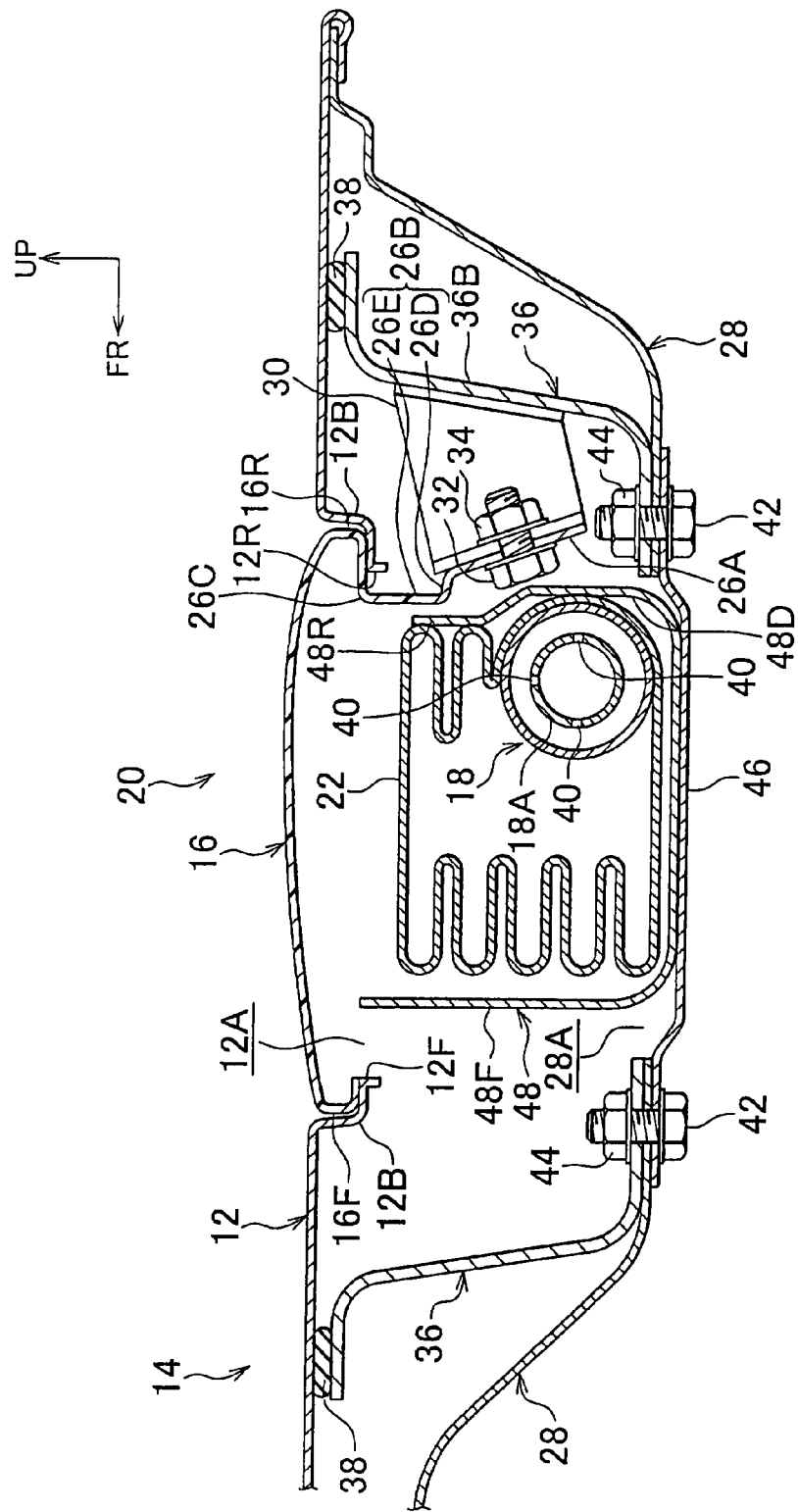
FIG. 5 is a sectional view taken along line 2-2 in FIG. 1, which shows a hood to which a hood airbag device according to a second embodiment of the invention is applied.

In each of the above-described embodiments, it is not described that the case 48 is deformed when the airbag 22 is deployed. However, in the case where the rear wall 48R of the case 48 is disposed ahead of the rear edge 12R of the opening 12A in the vehicle fore-and-aft direction as shown in FIG. 2 and FIG. 5, the rear wall 48R may be tilted toward the rear of the vehicle in the vehicle fore-and-aft direction to some extent, due to the inflation pressure of the airbag 22. With this configuration, the airbag 22 can be more easily deployed toward the rear of the vehicle in the vehicle fore-and-aft direction.

The invention claimed is:

1. A hood airbag device for a vehicle comprising:
   a door which is provided in a hood to cover an opening formed in the hood, and which pivots around a rear edge portion of the door, and is opened toward a rear of a vehicle in a vehicle fore-and-aft direction to uncover the opening;
   an inflator which is provided inside the hood at a position corresponding to the opening formed in the hood, and which is disposed such that a gas-injection port, through which gas is injected when a collision occurs, is positioned closer to a rear edge of the opening than to a front edge of the opening in the vehicle fore-and-aft direction; and
   an airbag which is provided inside the hood, which is inflated due to pressure of gas supplied from the inflator, and which passes through the opening in the hood, and is deployed toward an outside of the vehicle body, wherein:
   the airbag is disposed in a case which is provided inside the hood, and which is open toward the opening;
   a portion of the airbag, which is positioned above the inflator in a vehicle height direction, and a portion of the airbag, which is positioned ahead of the inflator in the vehicle fore-and-aft direction, are folded, and the portion of the airbag, which is positioned ahead of the inflator, is folded more times than the portion of the airbag, which is positioned above the inflator;
   the gas-injection port is provided integrally with the inflator, and the inflator is disposed at such a position that the inflator indirectly contacts an inside of a rear wall of the case in the vehicle fore-and-aft direction; and
   an attachment hinge is provided at the rear edge portion of the door, the attachment hinge including a first end attached to the door and a second end attached to the hood, the attachment hinge further including a first portion extending from the first end in the vehicle height direction and a second portion extending from the first portion toward the rear of the vehicle in the vehicle fore-and-aft direction, wherein the second end extends obliquely from the second portion toward a bottom of the vehicle.

2. The hood airbag device according to claim 1, wherein the attachment hinge includes a deformable portion that can be plastically deformed.

3. The hood airbag device according to claim 2, wherein the attachment hinge is provided in three portions, comprising a center portion and two end portions positioned outward of the center portion in the vehicle-width direction.

4. The hood airbag device according to claim 1, wherein the attachment hinge is provided in three portions, comprising a center portion, and two end portions positioned outward of the center portion in the vehicle-width direction.

5. The hood airbag device according to claim 1, wherein:
   a concave portion, which protrudes toward a rear of a vehicle in the vehicle fore-and-aft direction, is formed in a lower portion of the rear wall of the case; and
   the inflator is disposed at a position wherein the inflator indirectly contacts an inside of the concave portion.

6. The hood airbag device according to claim 1, wherein the rear wall of the case is deformed by a predetermined amount, toward a rear of the vehicle in the vehicle fore-and-aft direction due to inflation pressure of the airbag.

\* \* \* \* \*